United States Patent [19]

Richardson

[11] 4,348,673

[45] Sep. 7, 1982

[54] INSTRUMENTATION SYSTEM WITH ELECTRIC SIGNAL TRANSMITTER

[75] Inventor: David A. Richardson, Sheldonville, Mass.

[73] Assignee: The Foxboro Company, Foxboro, Mass.

[21] Appl. No.: 217,700

[22] Filed: Dec. 18, 1980

Related U.S. Application Data

[63] Continuation of Ser. No. 951,520, Oct. 13, 1978, abandoned.

[51] Int. Cl.³ .................. G08C 19/12; G08C 25/00
[52] U.S. Cl. .................. 340/870.18; 73/DIG. 1; 340/870.39; 340/870.42; 340/870.3
[58] Field of Search ............. 340/870.26, 870.18, 340/870.39, 870.42, 870.43, 310 R, 310 A, 870.01, 870.3; 73/DIG. 1, 517 AV, 862.59

[56] References Cited

U.S. PATENT DOCUMENTS

| Re. 27,596 | 3/1973 | Hurd | 340/870.39 |
|---|---|---|---|
| 3,387,266 | 6/1968 | Swartwout et al. | 340/870.43 |
| 3,560,948 | 2/1971 | Inose et al. | 340/870.42 |
| 3,683,344 | 8/1972 | Saito | 340/870.39 |
| 3,948,098 | 4/1976 | Richardson et al. | 340/870.42 |
| 3,975,719 | 8/1976 | Frick | 340/870.42 |
| 4,084,155 | 4/1978 | Herzol et al. | 340/870.39 |
| 4,118,977 | 10/1978 | Olsen et al. | 340/870.18 |

Primary Examiner—James J. Groody
Attorney, Agent, or Firm—Parmelee, Bollinger & Bramblett

[57] ABSTRACT

Instrument system including an electronic transmitter for a vibrating-wire differential-pressure sensor at a field location and connected by a two-wire line to a control room. The transmitter includes an oscillator to produce vibrations of the wire at its resonant frequency, and applies to the two-wire line a corresponding alternating voltage signal. The control room equipment converts this raw measurement data to an analog measurement signal. The control room equipment provides for adjustment of the zero and span of this signal, and for linearization with respect to the input differential pressure. The two-wire line carries a direct-current component the average value of which is automatically adjusted at the control room to match the scaled and linearized analog measurement signal. This line current passes through a meter at the transmitter to provide field service personnel with a visual indication of the value of the scaled and linearized measurement signal.

36 Claims, 4 Drawing Figures

FIG. 3 FIELD TRANSMITTER 12

FIG. 4

INSTRUMENTATION SYSTEM WITH ELECTRIC SIGNAL TRANSMITTER

This is a continuation of application Ser. No. 951,520 filed Oct. 13, 1978, now abandoned.

BACKGROUND OF THE INVENTION

1. Field of the Invention

This invention relates to instrument systems for use with industrial processes. More particularly, this invention relates to such systems wherein a measurement signal responsive to a process condition, such as differential pressure or the like, is transmitted from a field location to a signal-receiving location such as an instrument control room. The invention is illustrated in the preferred embodiment described hereinbelow for use in transmitting signals developed by a force sensor of the vibrating-wire type.

2. Description of the Prior Art

Force sensors of the vibrating-wire type have been known in the art for many years. Recent developments in such sensors have resulted in greatly improved performance capabilities, so that the use of vibrating-wire instrumentation has begun to increase significantly in the process industries. One particularly advantageous instrument of that type is disclosed in copending U.S. application Ser. No. 834,481, now U.S. Pat. No. 4,165,651 filed by E. O. Olsen et al on Sept. 19, 1977.

To use a vibrating-wire sensor as part of a modern instrument system requires that an electric-signal transmitter be provided for the sensor to develop a suitable signal corresponding to the force applied to the vibrating wire. One such transmitter is disclosed in U.S. Pat. No. 4,118,977, issued to E. O. Olsen et al on Oct. 10, 1978. In that transmitter, electronic circuitry for the vibrating-wire sensor includes an oscillator coupled through a two-wire line to the vibrating wire for inducing vibrations at the wire resonant frequency, and frequency-to-analog converter means for converting the oscillator frequency to a corresponding direct-current signal, e.g. in the range of 4 to 20 ma, suitable for transmission to a central station by a second two-wire line. The electronic circuitry in that arrangement ordinarily is located immediately adjacent the sensor, but may be remote from the sensor by a moderate distance which is limited by the characteristics of the two-wire line coupled to the vibrating wire.

The transmitter circuitry shown in U.S. Pat. No. 4,118,977 also includes additional signal-processing means for scaling the d-c signal to correspond with a prescribed measurement range, and for characterizing the signal to provide a linear relationship with respect to the applied force. Thus, the final d-c measurement signal can be utilized compatibly with the apparatus of established instrument systems employing similar direct-current sensor signals, control signals, and the like, for example computer-operated systems such as disclosed in copending U.S. application Ser. No. 737,195, now abandoned filed by R. A. Williamson, Jr., and R. W. Ford on Oct. 29. 1976.

Although known transmitter apparatus as described above has performed well, improvements are desirable in certain important respects. For example, it has been found to be particularly advantageous to reduce the amount of electronics required at the transmitter location. It also has been found quite desirable to be able to transmit additional information on the same transmission channel between the field station and the central station. Additionally, experience has shown the need to provide at the transmitter a simple and inexpensive means for indicating to field service personnel the actual value of the measurement as it appears at the distant control room. The present invention is directed to providing improvements in these and other respects.

SUMMARY OF THE INVENTION

In one preferred embodiment of the present invention, the electronic equipment required in the field has been reduced substantially by means of an arrangement wherein the transmitter produces a rapidly-varying alternating signal which is sent over the usual two-wire line to the control room. The measurement information is represented by the frequency of this alternating signal. The control room is provided with suitable signal-processing equipment to convert the received frequency signal to a corresponding analog signal, for example, a voltage signal of 0-10 volts. In addition, the signal-processing equipment provides for other pertinent functions, such as scaling of the signal magnitude to match a prescribed range, and linearization of the signal.

In accordance with another aspect of this invention, additional signal information can be transmitted over the two-wire line carrying the rapidly-varying alternating signal, in order to serve an ancillary function. This result is accomplished by slowly varying the d-c current level in the two-wire line in accordance with such additional information. In the preferred embodiment of the invention, such additional information is transmitted from the control room to the transmitter to provide an indication of the final processed measurement signal developed at the control room in response to the raw frequency signal from the transmitter. This final measurement signal value is available at the transmitter in the form of a direct-current signal, and thus can readily be displayed by conventional indicator means to show field service personnel the magnitude of the final measurement as developed at the control room. Such visual indication aids in setting up and calibrating that portion of the instrumentation system.

Accordingly, it is an object of this invention to provide an improved instrumentation system wherein a transmitter sends condition measurement signals to another location, as for processing and the like. Other objects, aspects and advantages of the invention will in part be pointed out in, and in part apparent from, the following description of a presently preferred embodiment of the invention, considered together with the accompanying drawings.

DESCRIPTION OF THE PREFERRED EMBODIMENT

Figure 1:
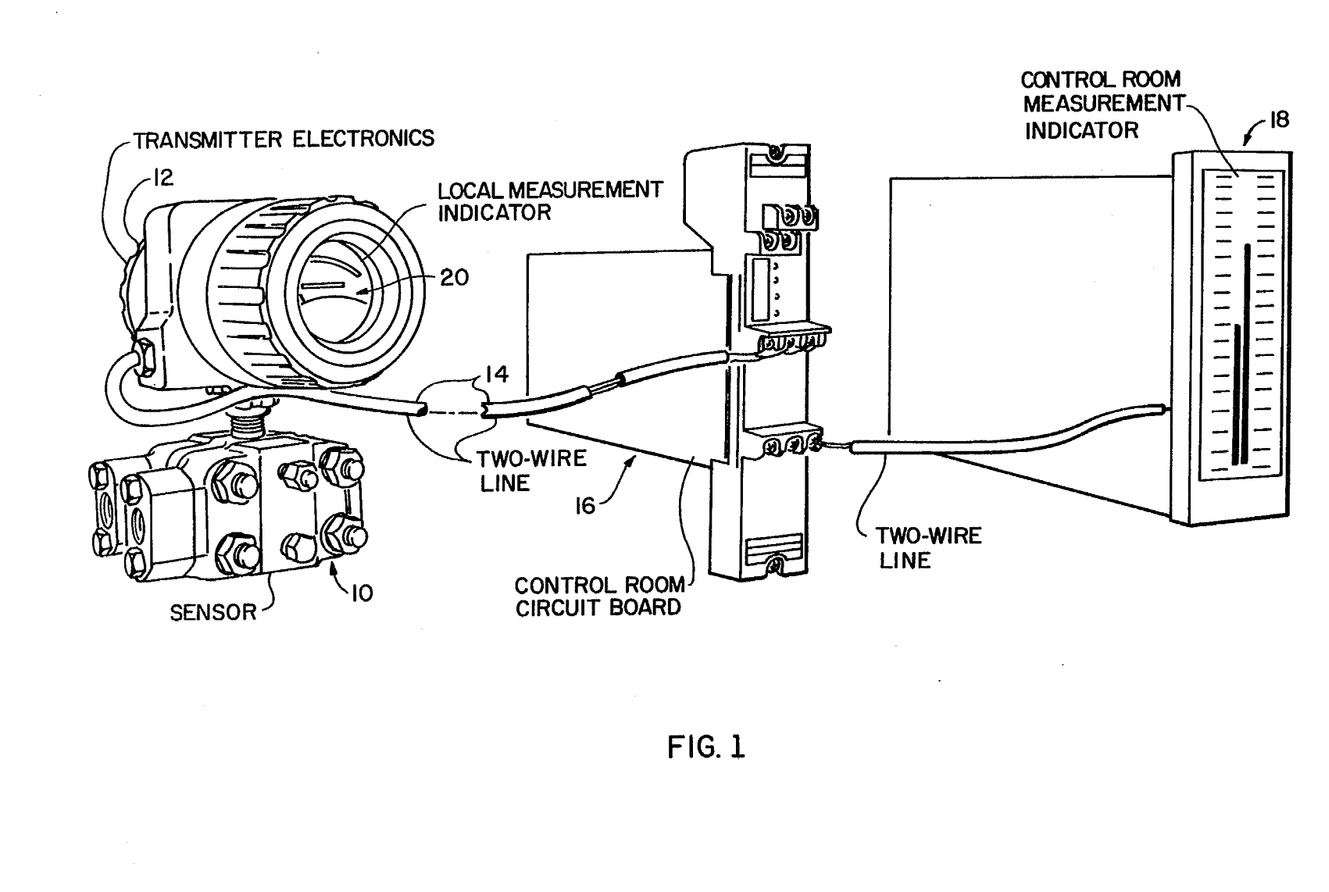
FIG. 1 is a pictorial representation of an instrument system in accordance with this invention.

Referring first to FIG. 1, there is shown at the left a field-mounted sensor 10 in the form of a differential-pressure measuring instrument of the vibrating-wire type, such as commonly used to measure fluid flow rates. Details of such a sensor are given in the above-identified copending application Ser. No. 834,481. Briefly, the instrument includes a taut wire tensioned in accordance with the differential pressure being sensed, so that the wire resonant frequency is a function of the differential pressure. The wire is coupled to oscillator circuitry forming part of a transmitter unit 12, and arranged to induce physical vibrations of the wire at its resonant frequency.

The transmitter 12 is coupled through a two-wire transmission line 14 to signal-receiving equipment at a distant central station, e.g. a control room located at a place up to 5000 feet from the field station. The control room equipment is illustrated as including a circuit board 16, having circuitry to perform signal-processing and other functions to be described. The two-wire line carries to the control room a rapidly-varying signal derived from the transmitter oscillator output signal, so that the frequency of this alternating signal corresponds to the tension of the vibrating wire, which in turn corresponds to the applied force being measured. Circuitry incorporated in the board 16 transforms this raw alternating signal to an analog measurement signal, in the range of 0 to 10 volts, suitably processed to provide a precise measure of the differential pressure. This analog signal is directed to still further equipment of the overall system illustrated in FIG. 1 for simplicity as a known indicating device 18 such as disclosed in copending application Ser. No. 809,148, now U.S. Pat. No. 4,180,860 filed by R. O, Driscoll et al on June 21, 1977.

In accordance with one aspect of the invention, the two-wire line 14 carries a direct-current component of finite average value, and the transmitter circuitry at the field station includes means to make use of that average direct-current component to supply all of the operating electric power for the oscillator, while simultaneously applying to the two-wire line the rapidly-varying voltage signal corresponding to the frequency of the wire vibration.

In accordance with a further aspect of the invention, the magnitude of the average component of direct current in the two-wire line 14 is controllable at a relatively slow rate (e.g. between 0 and 5 Hz) so as to carry additional information between the two stations. In the preferred embodiment, circuitry located in the control room is operable to vary the average direct-current component in accordance with the value of the final analog measurement signal, that is, the scaled and linearalized signal derived from the raw measurement signal from the transmitter 12. This modified analog signal information thus is made available at the remote field station and can be used, for example, to operate a visually-observable indicator such as the current meter illustrated at 20. The ready availability of such information at the field location can assist service personnel in assuring correct operation of the system.

Figure 2:
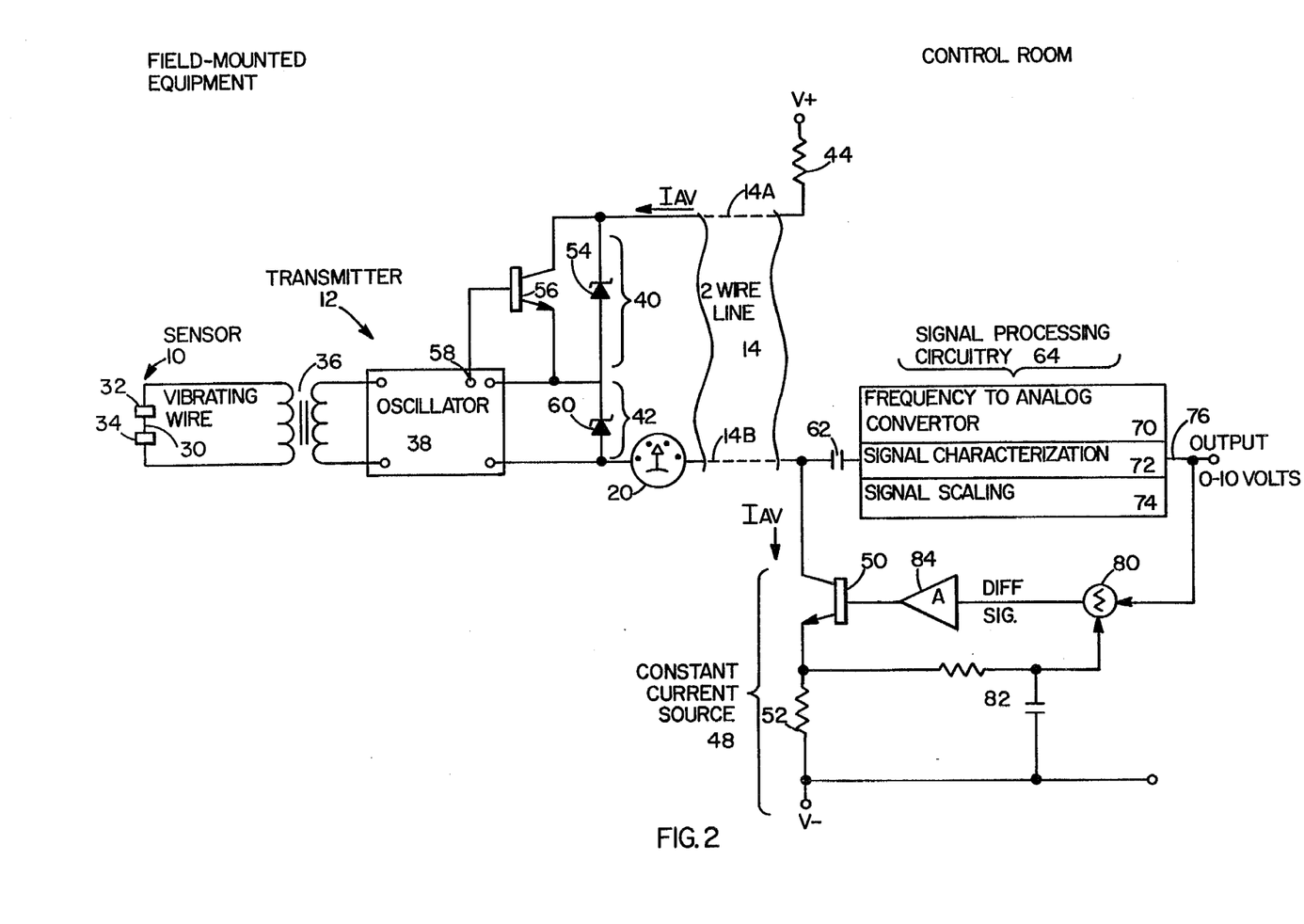
FIG. 2 is a simplified diagrammatic outline of the basic parts of the system of FIG. 1.

Turning now to FIG. 2, which shows the measurement system in somewhat greater detail, the sensor 10 is symbolically represented by the vibrating wire 30, mounted between two supports 32, 34 and electrically coupled through a transformer 36 to an oscillator 38. In known fashion, this oscillator supplies energy to the wire 30 to cause it to vibrate at its resonant frequency, corresponding to its tension force.

Coupled to the oscillator 38 are two circuits, generally indicated at 40 and 42, which are connected in series with each other, and in series with the two-wire line 14. At the other end of the two-wire line, one lead 14A is connected through a resistor 44 to a source of positive voltage. The other lead 14B is connected through a constant-current source 48 comprising a transistor 50 and an emitter resistor 52 returned to the negative power supply terminal. With this arrangement, a constant current $I_{av}$ flows through the two-wire line, having a magnitude determined in part by the emitter resistor 52, and controllable by the voltage applied to the base of the transistor 50.

The first series circuit 40 includes a Zener diode 54 in parallel with a transistor 56 the base of which is coupled to the output terminal 58 of the oscillator 38. The oscillator output signal alternately drives the transistor 56 between its conducting and non-conducting states at a relatively fast rate, e.g. in the range of 1700–3000 Hz, corresponding to the frequency of vibration of the wire 30. When the transistor is not conducting, $I_{av}$ flows through the Zener-diode 54, which has a breakdown voltage of about 3 volts. When the transistor 56 is conducting, $I_{av}$ flows through the transistor, which has a saturation voltage of about 0.25 volts. Thus, the circuit 40 applies to the two-wire line 14 a rapidly-changing alternating voltage of about 2.75 volts amplitude.

A portion of the two-wire line current $I_{av}$ flows through the second series circuit 42, comprising another Zener diode 60. This circuit develops a d-c voltage regulated to a constant magnitude by the Zener diode characteristic, and which serves as a d-c supply voltage for the oscillator 38 and all of the associated circuit elements at the transmitter 12.

The rapidly-varying alternating voltage developed by the first series circuit 40, as described above, is fed through the two-wire line 14, and through a coupling capacitor 62 to signal-processing circuitry generally indicated at 64. This circuitry performs several distinct functions in transforming the raw alternating signal from the transmitter 12 to an appropriately conditioned analog measurement signal compatible with other information and control signals utilized by the overall instrument system.

More specifically, now, the signal-processing circuitry 64 includes a frequency-to-analog converter 70 for producing an analog signal corresponding to the frequency of the incoming alternating signal on the two-wire line 14. The signal-processing circuitry further includes signal-characterization means 72, which operates on the signal data from the transmitter 12 to provide a linear relationship between the value of the final measurement signal and the magnitude of the force applied to the vibrating wire. The signal-processing circuitry also includes scaling means 74, which sets the zero and span characteristics of the final measurement signal, specifically, in this example, to produce a voltage signal in the range of 0 to 10 volts.

The final analog measurement signal from the signal-processing output 76 is fed to a differential summing device 80 together with a d-c voltage signal directed through a filter 82 from the emitter resistor 52. The differential output of the summing device is coupled to an amplifier 84 which drives the base of the constant-current source transistor 50. Thus this circuitry provides a feedback control which continuously adjusts the current through transistor 50 to a value directly corresponding to the magnitude of the scaled measurement signal at the output of the signal-processing equipment 64.

Since the current flowing through the transistor 50 is the same as $I_{av}$ through the two-wire line 14, this current provides at the transmitter 12 precise information as to the actual value of the final measurement signal which was developed from the raw alternating measurement signal produced by the oscillator 38. This direct current flows through the meter 20 to provide for the field service personnel a readily-available indication of the actual measurement signal level produced by the instrument system back at the control room.

Figure 3:
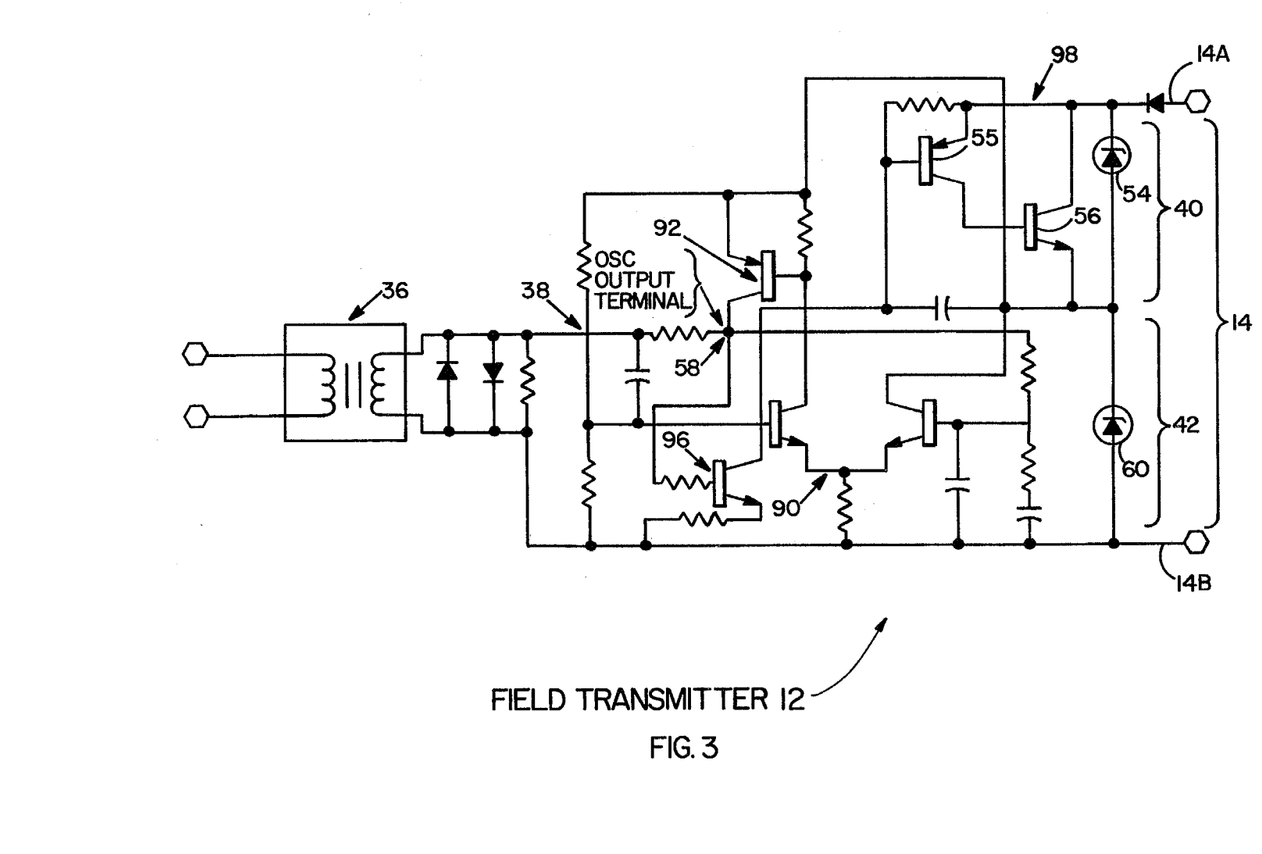
FIG. 3 is a detailed schematic of the transmitter portion of the system of FIG. 2.

Referring now to FIG. 3, showing a detailed schematic diagram of the transmitter 12, it will be seen that the secondary winding of the vibrating-wire transformer 36 is coupled to the oscillator circuit, generally indicated at 38, which is basically like that disclosed in the above-identified U.S. Pat. No. 4,118,977. This oscillator includes a differential-amplifier 90 driving a second amplifier 92 the output of which is coupled through split positive feedback paths to the inputs of the differential-amplifier 90. In operation, this oscillator produces at its output terminal 58 a square-wave alternating signal at the resonant frequency of the vibrating wire in the sensor 10.

The square-wave oscillator signal at output terminal 58 is directed through an amplifier 96 to a Darlington-connected transistor switch circuit generally indicated at 98 and including transistors 55 and 56. The latter transistor, as previously described, is paralleled with a Zener diode 54 in series with the two-wire line 14, and serves to apply to that line a square-wave alternating voltage signal of about 2.75 volts in amplitude. Also in series with the two-wire line is a second Zener diode 60 which develops from the direct current in the line a unidirectional voltage to serve as the supply voltage for the oscillator 38 and all of the circuit elements requiring power at the transmitter.

Figure 4:
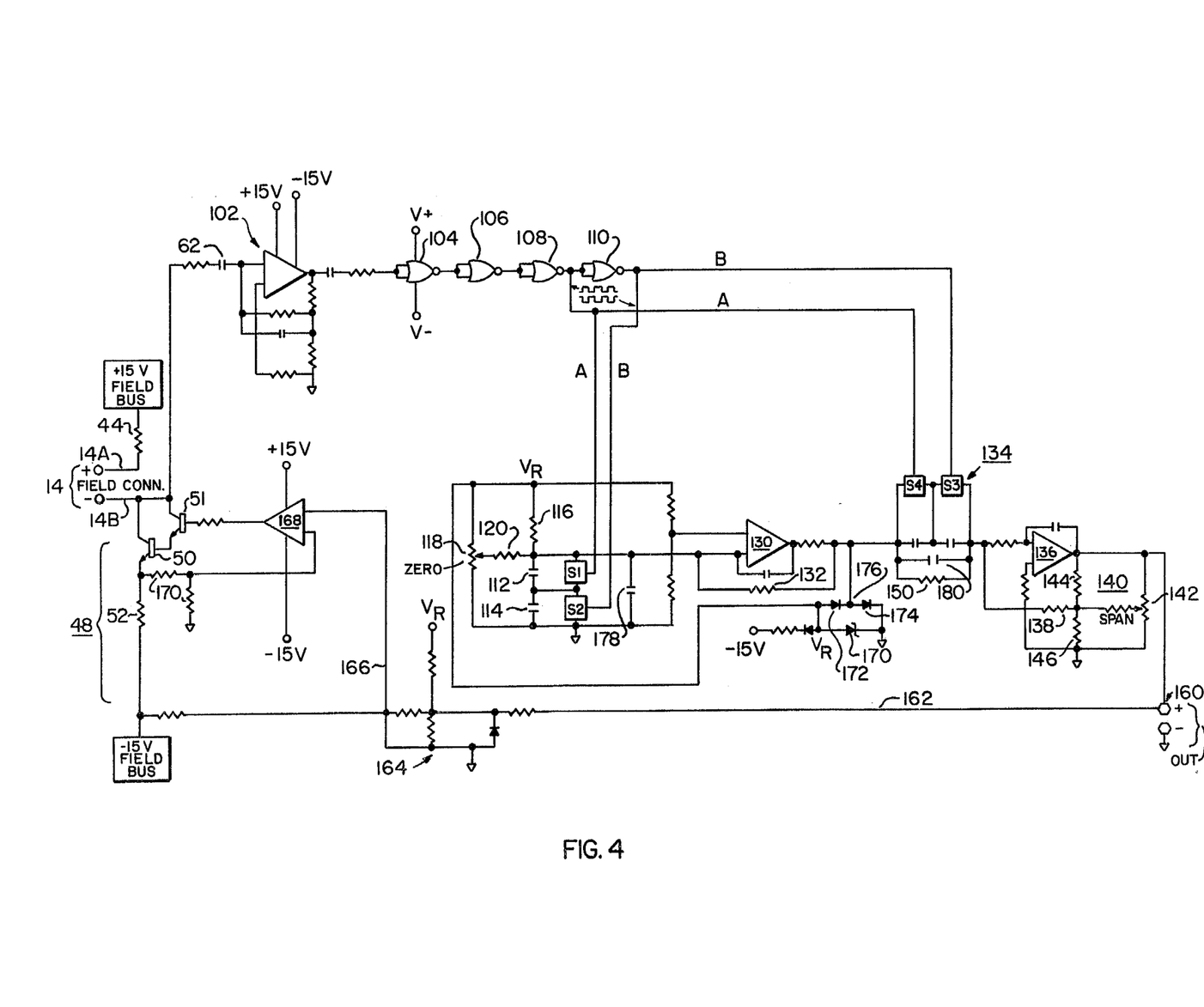
FIG. 4 is a detailed schematic of the control room portion of the system of FIG. 2.

Referring now to FIG. 4, showing a detailed schematic diagram of the control room electronics for the measurement system, the alternating square-wave voltage signal on the incoming two-wire line 14 is coupled through the capacitor 62 to a pulse-signal conditioning circuit 100 comprising a pre-amplifier 102. The output of this amplifier is directed to a series-connected set of NOR gates 104, 106, 108, 110, basically like those described in the above-identified U.S. Pat. No. 4,118,977. The outputs of the last two gates 108, 110 provide sharpened square-wave switch-control signals A and B, 180° out of phase with each other, as indicated graphically on the drawing. These switch-control signals are used to operate the frequency-to-analog converter means provided for developing an analog measurement signal from the raw alternating signal on the two-wire line 14.

The square-wave switch control signals A and B are directed to respective switches S1 and S2 which are across respective series-connected capacitors 112, 114, and serve to alternately short-circuit these capacitors at the frequency of the alternating signal on the line 14. The upper terminal of the top capacitor 112 receives current through a resistor 116 connected to a regulated source of reference voltage $V_R$. A parallel-connected potentiometer 118 and an isolation resistor 120 provide for diversion of an adjustable small portion of this current, to permit "zero" trimming of the instrument system as will be described.

As explained in the above-referenced U.S. Pat. No. 4,118,977, the operation of switches S1 and S2 serves to absorb current received from resistor 116 at a rate which is proportional to the frequency of the switch operation. The excess current received from resistor 116 (that is, the current which is not absorbed by the capacitor-switch circuit, or diverted through the zero potentiometer 118) is directed to one terminal of an operational amplifier 130, and flows through a negative feedback resistor 132 connected around that amplifier. In setting the instrument up for operation, the "zero" potentiometer 118 is adjusted to divert an amount of current to produce an amplifier output voltage of zero when zero differential pressure is applied to the sensor 10. Under such conditions, the vibrating wire 30 in one sensor had a resonant frequency of about 1700 Hz at zero input force.

With this arrangement, the output of the amplifier 130 will be a d-c voltage directly proportional to the difference between the actual resonant frequency of the vibrating wire and its zero-input resonant frequency $(f-f_o)$. This d-c voltage is fed as the input to a second capacitor-switch circuit 134 like that previously described, having a pair of switches S3 and S4 controlled by the switch-control signals A and B. This capacitor-switch circuit serves a multiplier function, to develop a flow of current proportional to the product of (1) the preceding amplifier output voltage and (2) the frequency of switch activation. Thus, since the output of the preceding amplifier is proportional to the zero-corrected wire resonant frequency $(f-f_o)$, the current developed by circuit 134 includes a component proportional to the square of the resonant frequency.

This square transfer-function developed by the capacitor-switch circuit 134 serves to characterize the current signal delivered thereby to provide linearization of the relationship between the current and the applied differential pressure. This current is directed to one input terminal of a second operational amplifier 136, and flows through a negative feedback resistor 138 to a span-adjusting network 140 connected to the output of the amplifier. This span circuit includes an adjustment potentiometer 142; and a pair of series-connected resistors 144, 146.

The input of the second operational amplifier 136 also receives, through a resistor 150 in parallel with the capacitor-switch circuit 134, a current which is proportional to the output voltage of the first operational amplifier 130, that is, proportional to the zero-corrected resonant frequency $(f-f_o)$ of the vibrating wire. This current serves to further characterize the total current signal supplied to the second operational amplifier 136 to provide for refinement of the linearization of the relationship between the signal and the applied differential pressure.

The output voltage of this operational amplifier 136 is zero when zero differential pressure is applied to the sensor 12. For inputs of finite value, the amplifier output comprises two frequency-responsive components, one proportional to the square of the wire resonant frequency, and one proportional to the first power of that resonant frequency. These two components provide a very close characterizing match with the nonlinear relationship between applied force and resonant frequency of the vibrating wire, thereby producing at output terminals 160 and output voltage which varies essentially linearly with respect to the differential pressure applied to the sensor 10.

The output voltage at terminals 160 also drives a negative feedback circuit 162 to control the direct current flowing in the two-wire line 14. For this purpose, the output voltage is directed to a resistance network generally indicated at 164, and which also is connected to the reference voltage $V_R$ and the $-15$ volt bus to provide for translation of the 0–10 volt output signal to a range matching that of the 4–20 ma line current. The resulting translated voltage is applied by a lead 166 to one input of a voltage-to-current converter 168, and serving as a differential summing device (see reference 80 in FIG. 2). The other input to the converter is supplied with a voltage received through a ratioing resistance network 170 (including suitable filtering, not shown) from the upper end of the emitter resistor 52 of the constant-current source 48. The output of the converter 168 drives a Darlington-connected pair of transistors 50, 51 to control the line current through resistor 52 so that it tracks the output voltage on terminals 160. Thus the meter 20 at the transmitter 12 provides a direct field indication of the actual value of the final analog measurement signal developed at the output terminal 160.

It may be noted with respect to the specific circuit details of the signal-processing means at the control room, that the reference voltage $V_R$ is developed by a Zener diode 171 supplied from the $-15$ volt bus and serving to produce a reference voltage of about 9 volts. Also, a pair of series-connected diodes 172, 174 are bridged across this Zener diode, with their common point 176 connected to the right-hand end of a resistor connected to the output of the first operational amplifier 130, to prevent the voltage at that point from exceeding the safe range for the switches S3 and S4 in the following capacitor-switch circuit 134. Capacitors 178 and 180 are provided at both capacitor-switch circuits to provide for filtering of the high-frequency components resulting from the switch action.

Although a preferred embodiment of the invention has been described hereinabove in detail, it is desired to emphasize that this is for the purpose of illustrating the principles of the invention, and should not necessarily be construed as limiting of the invention since it is apparent that those skilled in the art can make many modified arrangements of the invention without departing from the true scope thereof as expressed in the claims.

I claim:

1. In an instrument system of the type comprising a force sensor having a vibratable wire tensioned in accordance with the input force so that the resonant frequency of the wire is a measure of the applied force; the combination of:
   an oscillator coupled to said wire and operable therewith to develop an oscillator signal at the wire resonant frequency;
   signal-processing means including frequency-to-analog converter means;
   a two-wire transmission line coupled at one end to said oscillator and at the other end to said signal-processing means, said transmission line serving to direct to said frequency-to-analog converter means a rapidly-varying alternating signal corresponding in frequency to the oscillator signal, whereby said converter means produces an analog measurement signal responsive to the oscillator frequency;
   d-c signal means operable to produce in said transmission line a direct-current signal corresponding to said analog measurement signal; and
   indicator means coupled to said one end of said transmission line and arranged to produce a visual indication of the magnitude of said direct-current signal flowing in said transmission line.

2. Apparatus as claimed in claim 1, wherein said sensor is located at a field station and said signal-processing means is located at a central station;
   said direct-current signal having a live zero such that current is flowing continuously through the two-wire line at a level no less than a predetermined magnitude; and
   power supply means at said transmitter and operable with said direct-current signal to develop a unidirectional power supply voltage to furnish operating power to all of the elements requiring power at said transmitter.

3. Apparatus as claimed in claim 2, wherein said signal-processing means further comprises scaling means to develop said analog measurement signal with predetermined zero and span characteristics.

4. Apparatus as claimed in claim 3, wherein said scaling means develops said analog signal to have zero magnitude corresponding to zero applied force at said sensor.

5. Apparatus as claimed in claim 3, wherein said signal-processing means further comprises linearizing means to effect a linear relationship between said analog signal and said applied force.

6. Apparatus as claimed in claim 2, wherein said d-c signal means comprises a controllable constant-current source.

7. Apparatus as claimed in claim 6, wherein said constant-current source comprises a transistor connected in series with said two-wire line and having an emitter resistor;
   said d-c signal means further including means for comparing the level of the voltage across said resistor with the magnitude of said analog measurement signal, and for continuously adjusting the potential difference between the base of said transistor and the end of said emitter resistor which is remote from the emitter, to provide for tracking of said direct current with said analog measurement signal.

8. Apparatus as claimed in claim 6, wherein said transmitter includes means to apply to said two-wire line an alternating voltage signal, without affecting the magnitude of the current flow through said constant current source.

9. Apparatus as claimed in claim 8, wherein said voltage signal applying means comprises a Zener diode in series with said two-wire line; and
   a switch connected in parallel with said Zener diode and operated by said oscillator.

10. In an instrument system for making measurements of a process condition at one location and for transmitting such measurements to another location;
    the combination of:
    a transmitter comprising a condition-sensing element having a characteristic which varies with the condition being sensed;
    an oscillator forming part of said transmitter and coupled to said element to develop an oscillator frequency corresponding to said characteristic, the magnitude of said frequency thereby providing a measure of said condition;
    a signal-receiving station;
    a two-wire transmission line coupling said transmitter to said station;

d-c power supply means at said station and connected to said two-wire line to develop a flow of direct current through said line;

said transmitter including first and second circuits connected to said two-wire line;

said first circuit including means responsive to said flow of direct current to develop a d-c power supply voltage providing operating power for said oscillator;

said second circuit being coupled to the output of said oscillator and operable to apply to said two-wire line an alternating signal corresponding to the oscillator output signal, thereby to send to said signal-receiving station a frequency signal responsive to said condition being sensed;

said second circuit including a voltage-regulating device;

said first and second circuits being connected in series with each other and with said two-wire line; and frequency-to-analog converter means coupled to said two-wire line at said signal-receiving station to develop an analog measurement signal responsive to the frequency of said alternating signal on said two-wire line.

11. Apparatus as claimed in claim 10, including switch means connected to said voltage-regulating device to force the voltage thereacross to a lower level when the switch is actuated; and means coupled to said oscillator for actuating said switch means at the frequency of the signal produced by said oscillator, thereby to produce an alternating voltage signal on said line.

12. Apparatus as claimed in claim 11, wherein said voltage-regulating device comprises a Zener diode in series with said two-wire line; and said switch means comprises a transistor connected across said diode and driven between conducting and non-conducting states.

13. Apparatus as claimed in claim 12, wherein said first circuit comprises another Zener diode connected in series with said first mentioned Zener diode.

14. Apparatus as claimed in claim 10, wherein said frequency-to-analog converter means is arranged to produce an output voltage between zero and some predetermined finite value, corresponding to the full range of variation of the condition being sensed by said element.

15. An instrument system for making process condition measurements at one location and for transmitting corresponding signals to another location, comprising:

a transmitter station;

a condition-sensing element forming part of said transmitter station;

a signal generator at said transmitter station and coupled to said condition-sensing element to produce an alternating transmitter signal having a frequency responsive to said condition;

a signal-receiving station;

a two-wire line coupling said transmitter station to said signal-receiving station;

d-c power supply means at said signal-receiving station and coupled to said two-wire line to produce a flow of direct current therethrough;

a d-c power circuit at said transmitter station and coupled to said two-wire line to develop a d-c supply voltage from the direct current flowing in said two-wire line;

means coupling said d-c supply voltage to said signal generator to provide operating power thereto for producing said alternating transmitter signal;

means coupled to said two-wire line to produce an alternating measurement signal in said line at the frequency of said signal generator signal;

a constant-current source at said signal-receiving station and connected in series with said two-wire line to maintain a constant line current unaffected by said alternating voltage; and frequency-to-analog converter means coupled to said two-wire line at said signal-receiving station and operable to produce an analog measurement signal responsive to the frequency of said alternating measurement signal in said line.

16. Apparatus as claimed in claim 15, including a voltage-regulating device connected in series with said two-wire line normally producing thereacross a predetermined d-c voltage in response to the flow of current through that line; and means coupled to said signal-generator for forcing the voltage across said voltage-regulating device to a level less than said predetermined voltage in synchronism with the output of said signal generator, whereby to apply an alternating voltage to said two-wire line.

17. Apparatus as claimed in claim 15, including means to control the current level produced by said constant-current source in accordance with a pre-selected variable.

18. An instrument system for making process condition measurements at one location and for transmitting corresponding signals to another location, comprising:

a transmitter station;

a condition-sensing element forming part of said transmitter station;

a signal-generator at said transmitter station and coupled to said condition-sensing element to produce a transmitter signal having a frequency responsive to said condition;

a signal-receiving station;

a two-wire line coupling said transmitter station to said signal-receiving station;

d-c power supply means at said signal-receiving station and coupled to said two-wire line to produce a flow of current therethrough having an average direct-current component of finite magnitude;

means coupling the output of said signal generator to said two-wire line to direct thereto an alternating measurement signal in accordance with the frequency of the signal-generator output;

frequency-to-analog converter means coupled to said two-wire line at said signal-receiving station and operable to produce an analog measurement signal responsive to the frequency of the alternating measurement signal on said line;

d-c signal means responsive to a preselected variable and coupled to said two-wire line at one of said stations to vary the magnitude of said average direct-current component in said line in accordance with said preselected variable; and signal-responsive means at the other of said stations and coupled to said two-wire line to respond to the magnitude of said average direct-current component as controlled by said d-c signal means, whereby to transmit information respecting said preselected variable between said two stations while simultaneously transmitting said alternating measurement signal from said transmitter station to said signal-receiving station.

19. Apparatus as claimed in claim 18, wherein said d-c signal means comprises a constant-current source connected in series with said two-wire line to set the level of current therein.

20. Apparatus as claimed in claim 19, wherein said d-c signal means includes means responsive to said analog measurement signal for setting the current level through said line in correspondence therewith.

21. Apparatus as claimed in claim 17 or claim 20, including a device at said transmitter station coupled to said two-wire line and responsive to slow variations in the line current level to produce an action corresponding thereto.

22. Apparatus as claimed in claim 21, wherein said device at said transmitter station comprises an indicator showing the current level.

23. In an instrument system comprising a process-condition sensor at a field station having an element with a characteristic which varies with the condition being measured;

the combination of:
a transmitter at said field station including a signal generator coupled to said sensor element to develop an alternating signal responsive to said characteristic;
a central station;
a two-wire transmission line coupling said transmitter to said central station;
means to apply to said two-wire line an alternating signal corresponding in frequency to the output of said signal generator;
signal-processing means at said central station including means responsive to said alternating signal and operable to produce a condition-measurement signal scaled to correspond to a predetermined range of variation of said condition;
d-c signal means operable to produce in said two-wire transmission line a direct current signal corresponding to said scaled condition-measurement signal; and
indicator means at said field station and coupled to said two-wire line to produce a visual indication of the magnitude of said direct-current signal.

24. Apparatus as claimed in claim 23, wherein said signal-processing means comprises means to set the zero and span of said condition-measurement signal.

25. Apparatus as claimed in claim 24, wherein said signal-processing means comprises means to characterize said condition-measurement signal in accordance with a predetermined transfer function.

26. Apparatus as claimed in claim 25, wherein said characterizing means includes means to develop a linear relationship between the magnitude of said condition-measurement signal and said condition.

27. In an instrument system comprising a vibrating-wire sensor subject to a variable tension corresponding to an input condition and having an oscillator coupled thereto to produce an alternating signal at the wire resonant frequency;

frequency-to-analog conversion means for developing an analog measurement signal corresponding to said wire resonant frequency, comprising:
first multiplier means responsive to said alternating signal and including means arranged to produce a first analog current component proportional to the product of said frequency and an applied reference voltage;
a first operational amplifier coupled to the output of said first multiplier means to produce a first output voltage;
zero-setting means coupled to said first multiplier means;
means coupled to said first operational amplifier and operable with said zero-setting means to provide a zero first output voltage for said amplifier when said wire frequency corresponds to a zero-level input condition for said sensor;
second multiplier means responsive to the output of said first amplifier and to said alternating signal to produce a second output analog current component proportional to the product of said first amplifier output voltage and the frequency of said alternating signal;
a second operational amplifier coupled to the output of said second multiplier means to produce a second output voltage;
means coupled to said second operational amplifier to provide that said second output voltage is zero when said first output voltage is zero corresponding to zero input to said sensor; and
span-adjusting means connected to the output of said second operational amplifier to produce an analog measurement signal adjustably proportional to the input applied to said second operational amplifier whereby the span of said measurement signal is adjustable without interaction with the zero adjustment by said zero-setting means.

28. Apparatus as claimed in claim 27, wherein said first and second multiplier means comprises frequency-to-analog converter means of the capacitor-discharge type.

29. In an industrial process instrumentation system for sensing a process condition at one location and for transmitting corresponding signals to another location, apparatus comprising:
transmitting means for said one location;
a signal generator forming part of said transmitting means and arranged to produce an output signal having a frequency responsive to said process condition;
signal-receiving means for said other location;
a two-wire line coupling said transmitting means to said signal-receiving means;
d-c power supply means forming part of said signal-receiving means and coupled to said two-wire line to produce a flow of current therethrough having an average direct-current component;
means coupling the output of said signal generator to said two-wire line to direct thereto an alternating signal in accordance with the frequency of said signal-generator output;
detection means forming part of said signal-receiving means to detect the frequency of said alternating signal and to produce a corresponding signal;
d-c signal means responsive to a preselected variable and coupled to said two-wire line to vary the magnitude of said average direct-current component in said two-wire line in accordance therewith; and
signal-responsive means coupled to said two-wire line to respond to the magnitude of said average direct-current component as controlled by said d-c signal means.

30. Apparatus as claimed in claim 29, wherein said d-c signal means comprises a controllable current source connected in series with said two-wire line and operable to set the level of the average direct-current component in said two-wire line.

31. In an instrument system comprising a condition sensor subject to a variable input condition and having means to produce an alternating signal with a frequency corresponding to the condition;
frequency-to-analog conversion means for developing an analog measurement signal corresponding to said frequency, comprising:
first multiplier means responsive to said alternating signal and including means arranged to produce a first analog current component proportional to the product of said frequency and an applied reference voltage;
a first operational amplifier coupled to the output of said first multiplier means to produce a first output voltage;
zero-setting means coupled to said first multiplier means;
means coupled to said first operational amplifier and operable with said zero-setting means to provide a zero first output voltage for said amplifier when said frequency corresponds to a zero-level input condition for said sensor;
second multiplier means responsive to the output of said first amplifier and to said alternating signal to produce a second output analog current component proportional to the product of said first amplifier output voltage and the frequency of said alternating signal;
a second operational amplifier coupled to the output of said second multiplier means to produce a second output voltage;
means coupled to said second operational amplifier to provide that said second output voltage is zero when said first output voltage is zero corresponding to zero input condition to said sensor; and
span-adjusting means connected to the output of said second operational amplifier to produce an analog measurement signal adjustably proportional to the input applied to said second operational amplifier, the span of said measurement signal being adjustable without interaction with the zero adjustment by said zero-setting means.

32. In an instrumentation system of the type having at least one process condition sensor at a field station;
the combination of:
a transmitter at said field station including signal generator means coupled to said sensor to develop an alternating signal having a characteristic responsive to the process condition;
a second station;
a two-wire transmission line coupling said transmitter to said second station;
means to apply said alternating signal to said two-wire line;
signal-processing means at said second station coupled to said two-wire line and including means responsive to said characteristic of said alternating signal to produce in said line a direct-current signal scaled to correspond to a predetermined range of variation of said process condition; and
indicator means at said field station coupled to said two-wire line to produce a visual indication of the magnitude of said direct-current signal.

33. Apparatus as claimed in claim 21, wherein said characteristic is the frequency of said alternating signal.

34. In an industrial process instrumentation system having a number of separate stations and wherein one or more process conditions are measured to provide for supervision thereof, said instrumentation system being of the type including at least one two-wire line extending between two of said stations for carrying data relating to at least one of said process conditions, said two-wire line being connected at one location thereof to a d-c power source producing through said line a flow of current having an average direct-current component and operable to supply energizing power to apparatus connected to a remote location on said line;
the combination of:
a signal generator at one of said two stations and coupled to said two-wire line to produce therein an alternating signal having a characteristic which is variable in accordance with data to be transmitted;
signal-receiving means at the other of said two stations to receive said alternating signal;
detection means coupled to said signal-receiving means to detect said characteristic of said alternating signal and to produce a corresponding signal;
d-c signal means responsive to a preselected variable and coupled to said two-wire line to vary the magnitude of said average direct-current component in said line in accordance with said variable to produce a second data signal in said line; and
signal-responsive means coupled to said two-wire line to respond to the magnitude of said average direct-current component as controlled by said d-c signal means;
the frequency of alternations of said alternating signal being sufficiently rapid to avoid interfering with the function of said signal-responsive means in responding to said average direct-current component.

35. Apparatus as claimed in claim 34 wherein said characteristic is the frequency of said alternating signal.

36. Apparatus as claimed in claim 34, wherein said signal generator is coupled to said two-wire line at said remote location; and
power supply means at said remote location coupled to said two-wire line and energized by the flow of direct current through said line to activate said signal generator to produce said alternating signal.

* * * * *